(12) United States Patent
Kurachi

(10) Patent No.: US 7,094,488 B2
(45) Date of Patent: Aug. 22, 2006

(54) CARBON MONOXIDE SELECTIVE OXIDIZING CATALYST AND MANUFACTURING METHOD FOR THE SAME

(75) Inventor: Saeko Kurachi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 117 days.

(21) Appl. No.: 10/086,806

(22) Filed: Mar. 4, 2002

(65) Prior Publication Data
US 2002/0122755 A1 Sep. 5, 2002

(30) Foreign Application Priority Data
Mar. 5, 2001 (JP) ............................. 2001-060060

(51) Int. Cl.
H01M 8/22 (2006.01)

(52) U.S. Cl. .................. 429/22; 429/19; 422/177; 422/211

(58) Field of Classification Search ............... 502/64, 502/66, 71, 74; 429/17, 19, 13, 22; 423/437.1, 423/437.2; 422/177, 211
See application file for complete search history.

(56) References Cited

U.S. PATENT DOCUMENTS

| 4,385,195 | A | | 5/1983 | Butter et al. | |
| 4,485,185 | A | * | 11/1984 | Onodera et al. | 502/71 |
| 4,622,308 | A | | 11/1986 | Koikeda et al. | |
| 4,837,397 | A | | 6/1989 | Absil et al. | |
| 5,208,198 | A | * | 5/1993 | Nakano et al. | 502/74 |
| 5,609,751 | A | | 3/1997 | Wall | |
| 5,648,585 | A | | 7/1997 | Murray et al. | |
| 5,676,912 | A | * | 10/1997 | Sharma et al. | 423/213.2 |
| 5,702,838 | A | * | 12/1997 | Yasumoto et al. | 429/40 |
| 5,955,395 | A | * | 9/1999 | Andorf et al. | 502/74 |
| 6,133,185 | A | * | 10/2000 | Kinugasa et al. | 502/67 |
| 6,136,289 | A | * | 10/2000 | Szabo et al. | 423/700 |
| 6,168,772 | B1 | * | 1/2001 | Watanabe | 423/247 |
| 6,190,430 | B1 | | 2/2001 | Fukuoka et al. | |
| 6,726,890 | B1 | | 4/2004 | Watanabe | |
| 2003/0108471 | A1 | * | 6/2003 | Lee et al. | 423/247 |

FOREIGN PATENT DOCUMENTS

| EP | 0 369 576 A1 | | 8/1989 |
| EP | 0 833 401 | * | 4/1998 |
| EP | 0 888 815 A2 | | 1/1999 |
| EP | 1 046 612 A1 | | 10/2000 |
| EP | 1 059 264 A1 | | 12/2000 |
| EP | 1 059 265 A2 | | 12/2000 |
| EP | 1 166 854 A1 | | 1/2002 |
| JP | 6-198192 | * | 7/1994 |
| JP | A 9-320624 | | 12/1997 |
| JP | 10-212104 | | 8/1998 |
| JP | A 11-130406 | | 5/1999 |
| JP | A 11-347414 | | 12/1999 |
| WO | WO 99/64153 | | 12/1999 |

OTHER PUBLICATIONS

Claudia Weidenthaler et al., "Pitfalls in the powder diffraction analysis of zeolites ZSM-5 and ZSM-8," vol. 9, No. 3 1994, pp. 204-212, Sep. 1994.
Claudia Weidenthaler et al., "The essential identify of the framework structure of ZSM-8 and ZSM-5," vol. 84, 1994 pp. 551-558.

* cited by examiner

Primary Examiner—Christina Johnson
(74) Attorney, Agent, or Firm—Oliff & Berridge, PLC

(57) ABSTRACT

A carbon monoxide selective oxidizing catalyst includes a carrier of ferrierite or ZSM-5 that supports a metal component of platinum (Pt) alone or platinum and at least one type of transition metal. Alternatively, a carbon monoxide selective oxidizing catalyst includes a carrier whose maximum pore diameter ranges from 0.55 to 0.65 nanometers (nm) that supports a metal component of platinum (Pt) alone or platinum and at least one type of transition metal.

11 Claims, 12 Drawing Sheets

EXAMPLE 12-1 NO REDUCTION PROCESSING

EXAMPLE 12-2 REDUCTION PROCESSING AT 300°C

EXAMPLE 12-3 REDUCTION PROCESSING AT 350°C

EXAMPLE 12-4 REDUCTION PROCESSING AT 400°C

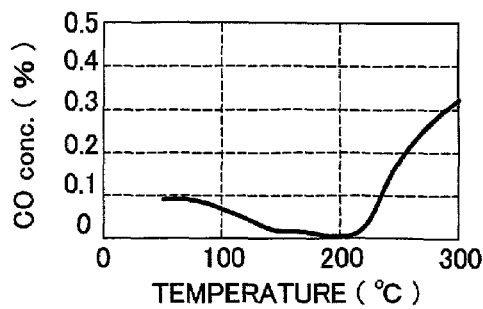
FIG. 11A  EXAMPLE 12-5 REDUCTION PROCESSING AT 450°C
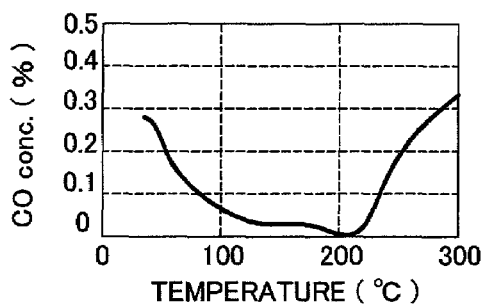
FIG. 11B  EXAMPLE 12-6 REDUCTION PROCESSING AT 500°C
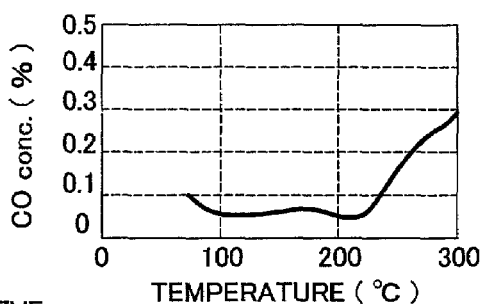
FIG. 11C  EXAMPLE 12-7 REDUCTION PROCESSING AT 600°C
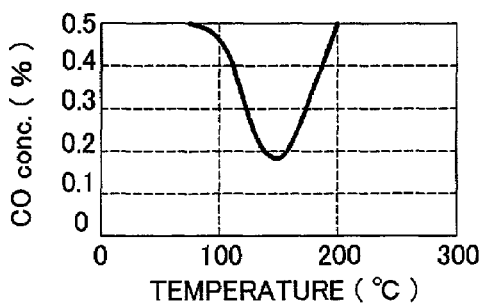
FIG. 11D  COMPARATIVE EXAMPLE 5

CARBON MONOXIDE SELECTIVE OXIDIZING CATALYST AND MANUFACTURING METHOD FOR THE SAME

INCORPORATION BY REFERENCE

The disclosure of Japanese Patent Application No. 2001-060060 filed on Mar. 5, 2001, including the specification, drawings and abstract is incorporated herein by reference in its entirety.

BACKGROUND OF THE INVENTION

1. Field of Invention

The invention relates to carbon monoxide selective oxidizing catalysts that promote a reaction of oxidizing carbon monoxide by giving carbon monoxide priority over hydrogen and manufacturing methods for the same.

2. Description of Related Art

A reformed gas obtained by reforming gasoline or a hydrocarbon-based fuel such as natural gas or alcohol is employed as a hydrogen-rich fuel gas used in an electrochemical reaction in a fuel cell. Such a reformed gas generally contains a certain amount of carbon monoxide. However, in a fuel cell provided with a platinum-based catalyst such as a proton-exchange membrane fuel cell, if the supplied gas contains carbon monoxide, the catalyst may be poisoned by carbon monoxide and the cell performance may deteriorate. Therefore, a carbon monoxide concentration reduction apparatus is employed to reduce the concentration of carbon monoxide contained in the reformed gas before the reformed gas is supplied to the fuel cell, thereby preventing the catalyst in the fuel cell from being poisoned by carbon monoxide.

One of the reactions performed in the carbon monoxide concentration reduction apparatus is a carbon monoxide selective oxidizing reaction that oxidizes carbon monoxide by giving carbon monoxide priority over hydrogen. The oxidation reaction of carbon monoxide is represented by an equation I described below.

$$CO + (1/2)O_2 \rightarrow CO_2 \qquad \text{I}$$

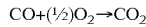

Various types of catalysts that promote such a carbon monoxide selective oxidizing reaction are known. For example, Japanese Patent Application Laid-Open Publication No. 11-347414 discloses a catalyst in which a platinum alloy is supported on a carrier including mordenite, a kind of zeolite. According to the art disclosed in this publication, the percentage of metals other than the platinum contained in the platinum alloy is controlled to 20 to 50 atomic percent, thereby improving the performance of the carbon monoxide selective oxidizing catalyst.

However, even in a case where the above-mentioned carbon monoxide selective oxidizing catalyst is used, the performance of reducing the concentration of the carbon monoxide contained in the fuel gas supplied to the fuel cell may be insufficient. Therefore, it is desired to obtain a carbon monoxide selective oxidizing catalyst with much superior performance of reducing the concentration of the carbon monoxide.

Generally, activity of the reaction promoted by catalysts can be improved by increasing the reaction temperature. On the other hand, the above-mentioned carbon monoxide selective oxidizing reaction is to selectively oxidize an extremely small amount of carbon monoxide present in a large amount of hydrogen. Therefore, in general, as the reaction temperature becomes higher, the oxidizing reaction of hydrogen becomes more active, thereby decreasing the efficiency of reducing the carbon monoxide concentration. This results in a problem that the fuel utilization efficiency decreases. In addition, as the reaction temperature becomes higher, undesirable reactions (for example, a methanation reaction that methanates hydrogen) become more active to consume more hydrogen, in addition to the carbon monoxide selective oxidizing reaction. This causes a problem that the fuel utilization efficiency decreases. Therefore, to improve performance of the entire fuel cell system, it is desirable that the carbon monoxide selective oxidizing catalyst should achieve a higher carbon monoxide concentration reduction rate, provide higher selectivity in oxidizing carbon monoxide, and exhibit sufficient activity at lower temperatures.

SUMMARY OF THE INVENTION

One object of the invention is to provide a superior technology for reducing the concentration of carbon monoxide contained in a hydrogen-rich gas that contains carbon monoxide, like a reformed gas.

A first aspect of the invention relates to a carbon monoxide selective oxidizing catalyst provided with a carrier which includes ferrierite or ZSM-5; and a metal component supported on the carrier and which includes platinum (Pt) alone or platinum (Pt) and at least one type of transition metal. This carbon monoxide selective oxidizing catalyst receives a supply of a hydrogen-rich gas containing carbon monoxide, and promotes a carbon monoxide selective oxidizing reaction that oxidizes the carbon monoxide by giving the carbon monoxide priority over hydrogen.

A second aspect of the invention relates to a carbon monoxide selective oxidizing catalyst provided with a carrier whose maximum pore diameter ranges from 0.55 to 0.65 nanometers (nm); and a metal component supported on the carrier and which includes platinum (Pt) alone or platinum (Pt) and at least one type of transition metal. This carbon monoxide selective oxidizing catalyst receives a supply of a hydrogen-rich gas containing carbon monoxide and promotes a carbon monoxide selective oxidizing reaction that oxidizes the carbon monoxide by giving the carbon monoxide priority over hydrogen.

A third aspect of the invention relates to a carbon monoxide selective oxidizing catalyst which receives a supply of a hydrogen-rich gas containing carbon monoxide, and promotes a carbon monoxide selective oxidizing reaction that oxidizes the carbon monoxide by giving the carbon monoxide priority over hydrogen. It is provided with a metal component that includes platinum (Pt) alone or platinum (Pt) and at least one type of transition metal. This carbon monoxide selective oxidizing catalyst achieves a carbon monoxide reduction rate of 90% or higher when it performs the carbon monoxide selective oxidizing reaction under conditions (a) through (c) described below:

(a) The contents of components other than hydrogen in the hydrogen-rich gas are as follows: the carbon monoxide concentration is about 5000 ppm; the carbon dioxide concentration is about 25%; and the oxygen content is such that the molar ratio value between oxygen atoms and carbon monoxide molecules ([O]/[CO]) is 1.

(b) The space velocity is about 22000 $h^{-1}$ when the hydrogen-rich gas is supplied onto the carbon monoxide selective oxidizing catalyst.

(c) The reaction temperature is about 130° C.

A molar ratio value between Y and Z ([Y]/[Z]) means the number of moles of Y for 1 mole of Z.

A fourth aspect of the invention relates to a manufacturing method for a carbon monoxide selective oxidizing catalyst which receives a supply of a hydrogen-rich gas containing carbon monoxide, and promotes a carbon monoxide selective oxidizing reaction that oxidizes the carbon monoxide by giving the carbon monoxide priority over hydrogen. The manufacturing method includes the following processes (α1) and (α2):

the process (α1) prepares a carrier consisting essentially of one of ferrierite and ZSM-5;

the process (α2) supports on the carrier prepared in process (α1), a metal component that includes platinum (Pt) alone or platinum (Pt) and at least one type of transition metal.

A fifth aspect of the invention relates to a manufacturing method for a carbon monoxide selective oxidizing catalyst which receives a supply of a hydrogen-rich gas containing carbon monoxide, and promotes a carbon monoxide selective oxidizing reaction that oxidizes the carbon monoxide by giving the carbon monoxide priority over hydrogen. The manufacturing method includes the following processes (β1) and (β2):

the process (β1) prepares a carrier whose maximum pore diameter ranges from 0.55 to 0.65 nanometers (nm);

the process (β2) supports on the carrier prepared in the process (β1), a metal component that includes platinum (Pt) alone or platinum (Pt) and at least one type of transition metal.

According to the carbon monoxide selective oxidizing catalysts in the above-mentioned aspects of the invention, and the carbon monoxide selective oxidizing catalysts manufactured in the above-mentioned aspects of the invention, it is possible to achieve a higher carbon monoxide reduction rate when the carbon monoxide concentration in the hydrogen-rich gas is reduced.

A sixth aspect of the invention relates to a carbon monoxide concentration reduction apparatus including a hydrogen-rich gas supply that supplies the hydrogen-rich gas; an oxygen supply that supplies oxygen used for oxidizing the carbon monoxide; the carbon monoxide selective oxidizing catalyst according to one of the first to the third aspect of the invention; and a carbon monoxide selective oxidizing reactor. The carbon monoxide selective oxidizing reactor includes the catalyst and receives a supply of the hydrogen-rich gas and the oxygen from the hydrogen-rich gas supply and the oxygen supply, respectively, and selectively oxidizes the carbon monoxide contained in the hydrogen-rich gas through the carbon monoxide selective oxidizing reaction. The carbon monoxide concentration reduction apparatus oxidizes the carbon monoxide contained in the hydrogen-rich gas, thereby reducing the carbon monoxide concentration in the hydrogen-rich gas.

A seventh aspect of the invention relates to a fuel cell system provided with a fuel cell that receives a supply of a fuel gas containing hydrogen and an oxidizing gas containing oxygen to obtain an electromotive force through an electrochemical reaction. The fuel cell system is provided with a fuel gas supply that supplies the fuel gas to the fuel cell. The fuel gas supply is provided with the carbon monoxide concentration reduction apparatus according to the sixth aspect of the invention. The fuel gas supply supplies the fuel cell with a hydrogen-rich gas whose carbon monoxide concentration has been reduced as the fuel gas, by using the carbon monoxide concentration reduction apparatus.

According to the carbon monoxide selective oxidizing catalysts in the above-mentioned aspects of the invention, and the carbon monoxide selective oxidizing catalysts manufactured in the above-mentioned aspects of the invention, it is possible to achieve a higher carbon monoxide reduction rate when the carbon monoxide concentration in the hydrogen-rich gas is reduced. In addition, a carbon monoxide selective oxidizing catalyst may be manufactured by supporting a transition element on the carrier in addition to platinum (Pt). Such a carbon monoxide selective oxidizing catalyst can achieve a sufficiently high carbon monoxide reduction rate even when the reaction temperature of the carbon monoxide selective oxidizing reaction is set at a lower value. Since a high carbon monoxide reduction rate can be achieved even when the reaction temperature is set at a lower value, it is possible to perform the carbon monoxide selective oxidizing reaction at a temperature that can sufficiently suppress activity of undesirable reactions. This improves the efficiency of reducing the carbon monoxide concentration in the hydrogen-rich gas. Since the efficiency of reducing the carbon monoxide concentration is improved, it becomes possible to build a more compact apparatus provided with the carbon monoxide selective oxidizing catalyst.

According to the above-mentioned aspects of the invention, it is possible to improve the selectivity in selectively oxidizing only the carbon monoxide when the carbon monoxide concentration in the hydrogen-rich gas is reduced, which improves the efficiency of reducing the carbon monoxide concentration in the hydrogen-rich gas. If the hydrogen-rich gas in which the carbon monoxide concentration is reduced using the carbon monoxide selective oxidizing catalyst is supplied to the fuel cell, the fuel cell catalyst can be prevented from being poisoned by carbon monoxide, and thus the cell performance can be maintained at a high level.

BRIEF DESCRIPTION OF THE DRAWINGS

The invention will be described in conjunction with the following drawings in which like reference numerals refer to similar elements and wherein:

FIGS. 11A to 11D are explanatory diagrams showing the results of a comparison regarding the temperature dependency of carbon monoxide oxidizing performance in different types of carbon monoxide selective oxidizing catalysts processed while changing the reduction processing temperature;

DETAILED DESCRIPTION OF PREFERRED EMBODIMENTS

Figure 1:
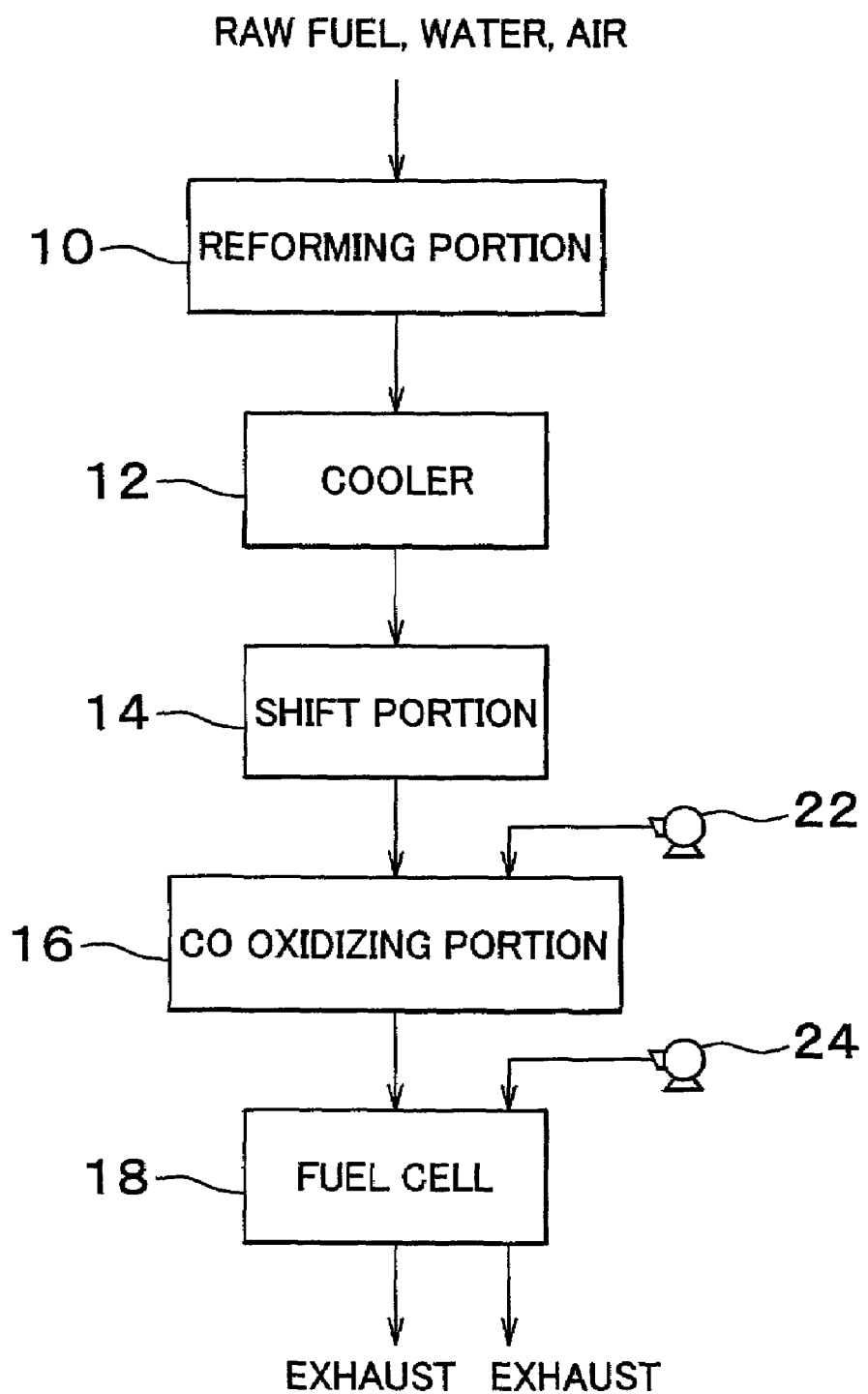
FIG. 1 is an explanatory diagram showing a configuration of a fuel cell system.

A carbon monoxide selective oxidizing catalyst according to a first embodiment of the invention is provided with a carrier which includes ferrierite or ZSM-5; and a metal component which includes platinum (Pt) alone or platinum (Pt) and at least one type of transition metal and which is supported on the carrier. Each of the ferrierite and ZSM-5 is a kind of zeolite which is a porous body having a number of pores in a predetermined size. Each of the atoms of zeolite forms a three-dimensional network structure in which tetrahedrons share a vertex. A void formed in this three-dimensional network structure corresponds to a pore.

When the carbon monoxide selective oxidizing catalyst is used to promote the carbon monoxide selective oxidizing reaction in the hydrogen-rich gas containing carbon monoxide, carbon monoxide and hydrogen move through the pores together with oxygen. At this time, if the size of the pore is within an appropriate range, hydrogen whose molecule is small moves through the pores quickly, while carbon monoxide and oxygen whose molecules are larger tend to stay in the pores (i.e., in the catalyst) for a longer period of time. As a result, it is considered that carbon monoxide becomes easier to oxidize selectively. Thus, it is considered that the size of the pore, particularly the value of the longest diameter in the pore, i.e., the maximum pore diameter is an important factor directly associated with the carbon monoxide selective oxidizing performance.

According to the first embodiment, the size of the pore of ferrierite used as the carrier is 0.43×0.55 nm, for example, and the maximum pore diameter is 0.55 nm. The size of the pore of ZSM-5 is 0.54×0.54 nm, for example, and the maximum pore diameter is 0.54 nm. For example, in the case of zeolite A, another type of zeolite, the pore diameter size varies depending on the type of exchange cation. For example, when the exchange cation is $Na^+$, the pore size is 0.42×0.42 nm (the maximum pore diameter is 0.42 nm), and when the exchange cation is $Ca^{2+}$, the pore size is 0.5×0.5 nm (the maximum pore diameter is 0.5 nm). In the case of mordenite, still another type of zeolite, the pore size is 0.67×0.70 (the maximum pore diameter is 0.7 nm). In the carrier (ferrierite, ZSM-5) of the carbon monoxide selective oxidizing catalyst according to the first embodiment, the pore has an appropriate size. Therefore, the catalyst achieves outstanding catalytic performance (a higher carbon monoxide reduction rate) as the carbon monoxide selective oxidizing catalyst.

A carbon monoxide selective oxidizing catalyst according to a second embodiment of the invention is provided with a carrier having the maximum pore diameter of 0.55 to 0.65 nanometers (nm); and a metal component which includes platinum (Pt) alone or platinum and at least one type of transition metal and which is supported on the carrier. By setting the maximum pore diameter so as to be in the above-mentioned range, the catalyst achieves superior catalytic performance (a higher carbon monoxide reduction rate) as the carbon monoxide selective oxidizing catalyst as mentioned above.

According to the second embodiment, a carrier other than ferrierite and ZSM-5 can be used, but a solid acid is preferably used as the carrier. It is presumed that the electron density of Pt decreases on a surface of the carbon monoxide selective oxidizing catalyst manufactured using a solid acid as the carrier, a bonding strength between Pt and carbon monoxide is weakened, and Pt is bound with oxygen more easily. When the electron density of Pt decreases, electrons of Pt flow toward the carrier side as observed microscopically, and Pt assumes more positive charges. In general, carbon monoxide has high adsorptivity with respect to platinum. Therefore, a catalyst including platinum may be poisoned by carbon monoxide, and accordingly its catalytic performance may deteriorate. In the case where the carrier including a solid acid is used, however, it is considered that the bonding strength between Pt and carbon monoxide is weakened and accordingly the carbon monoxide selective oxidizing catalyst can be prevented from being poisoned by carbon monoxide. Moreover, it is considered that Pt is bound with oxygen more easily, and accordingly the carbon monoxide selective oxidizing reaction can be further promoted. The above-mentioned zeolite is also a kind of solid acid.

In the first and the second embodiments, as the transition metal supported on the carrier together with Pt, one or two or more types of metals are preferably selected from the group consisting of iron (Fe), nickel (Ni), cobalt (Co), manganese (Mn), copper (Cu), ruthenium (Ru), chromium (Cr), palladium (Pd), rhodium (Rh), and iridium (Ir).

Supporting a transition metal together with Pt increases the carbon monoxide reduction rate. One of the reasons is thought to be that when a transition metal is supported on a carrier constructed using a solid acid, the electron density of the transition metal decreases. In other words, it is presumed that the transition metal assumes more positive charges on the carrier including solid acid when electrons flow toward the carrier side as observed microscopically, and accordingly the electron density thereof decreases. A method called X-ray photoelectron spectroscopy (XPS) may be used to measure binding energy of electrons, thereby determining the electron density. In an example to be described later, the XPS was applied to ascertain that there was a drop in electron density of the transition metal (not shown). As mentioned above, it is presumed that when electron density decreases, the metal is bound with oxygen more easily. It is therefore considered that when there is a transition metal whose electron density has decreased near Pt, more oxygen required for oxidizing carbon monoxide tends to be supplied to Pt that exhibits actual catalytic activity, thereby promoting the carbon monoxide selective oxidizing reaction. To obtain the effect of facilitating the supply of oxygen to Pt more sufficiently, it is desirable that the transition metal supported together with Pt should have the property of being oxidized more easily and forming a stable oxide more easily. For this reason, the transition metal is preferably selected from the group described above.

When supporting the transition metal together with Pt on the carrier, Pt or the transition metal may be the first to be supported, or both may be supported at the same time. As the supporting method, various common methods including an ion exchange method or an impregnation method may be used. It is also possible to positively make an alloy of Pt and the above-mentioned transition metal to be supported on the carrier. In addition, as the above-mentioned transition metal, one type of metal, or two or more types of metals may be used.

By using the carbon monoxide selective oxidizing catalyst that supports the transition metal together with Pt on the carrier, a higher carbon monoxide reduction rate is achieved. In addition, the carbon monoxide reduction rate can be improved in a wide temperature range, particularly in a low temperature range of 200° C. or lower. Since the carbon monoxide reduction rate is improved in the lower temperature range, it becomes possible to perform carbon monoxide selective oxidizing reaction at a low temperature at which the activity of undesirable reactions such as a reverse shift reaction and a methanation reaction is sufficiently low.

The reverse shift reaction refers to a reaction in which carbon monoxide and water are produced from carbon dioxide and hydrogen. This reaction can proceed in an environment where the carbon monoxide selective oxidizing reaction proceeds. When the activity of the reverse shift reaction becomes high, there arise problems that reduction of the carbon monoxide concentration is inhibited and hydrogen is consumed. Since the reverse shift reaction has a characteristic that the activity becomes higher as the temperature becomes higher, the reverse shift reaction can be suppressed by performing the carbon monoxide selective oxidizing reaction at a lower temperature. The reverse shift reaction is represented by an equation II described below.

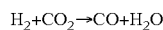

$$H_2 + CO_2 \rightarrow CO + H_2O \qquad \text{II}$$

The methanation reaction is a reaction in which methane is produced from hydrogen, and thus hydrogen is consumed. As the temperature becomes higher when the carbon monoxide selective oxidizing reaction proceeds, undesirable reactions such as the methanation reaction proceed more easily. By performing the carbon monoxide selective oxidizing reaction in a temperature range in which the activity of such undesirable reactions is sufficiently low (for example, 100 to 180° C., preferably 100 to 150° C.), it becomes possible to improve the efficiency of obtaining a hydrogen-rich gas of high purity.

If iron (Fe) is used as the transition metal supported together with Pt on the carrier in manufacturing a carbon monoxide selective oxidizing catalyst, the molar ratio value between the platinum content in a solution used for supporting the platinum on the carrier and the iron content in a solution used for supporting the iron on the carrier ([Pt]/[Fe]) is preferably 1.5 to 7.5, and more preferably 2 to 6, and most preferably about 4.

By setting the molar ratio value between platinum and iron to the above-mentioned value, the carbon monoxide reduction rate can be improved in a lower temperature range. Therefore, it is possible to perform the carbon monoxide selective oxidizing reaction in a temperature range in which the activity of the above-mentioned undesirable reactions is sufficiently low, thereby improving the efficiency of obtaining the hydrogen-rich gas of high purity.

When manufacturing the carbon monoxide selective oxidizing catalyst, the carbon monoxide selective oxidizing catalyst is preferably subjected to a reduction processing after the metal component has been supported on the carrier and before the catalyst is used for promoting the carbon monoxide selective oxidizing reaction. It is preferable that the reduction processing be performed at a temperature higher than the reaction temperature when the carbon monoxide reduction apparatus is used. When the carbon monoxide reduction apparatus is used, the reaction temperature may be the temperature of the hydrogen-rich gas used for the carbon monoxide selective oxidizing reaction (that is, the temperature of an incoming gas when a hydrogen-rich gas is supplied to the carbon monoxide reduction apparatus). Alternatively, the reduction processing temperature is preferably set at 150 to 370° C., and more preferably at 150 to 350° C.

Performing the reduction processing at such temperature ranges greatly contributes to ensuring good catalytic performance in a temperature range in which the activity of undesirable reactions that can proceed with the carbon monoxide selective oxidizing reaction is sufficiently low (for example, 100 to 180° C.). If the reduction processing temperature exceeds 400° C., it is considered that the deterioration of the carrier, i.e., zeolite or the deterioration of the catalyst resulting from sintering of Pt progresses.

When manufacturing the carbon monoxide selective oxidizing catalyst, the metal component (Pt and transition metals) is generally subjected to calcination after having been supported on the carrier. Owing to calcination, almost the entire portion of the metal component on the carrier is oxidized. The reduction processing is a processing for reducing the metal which has been oxidized as described above to obtain catalytic performance. In the case where a catalyst which has not been subjected to the reduction processing is used, when the hydrogen-rich gas used in the carbon monoxide selective oxidizing reaction is supplied to the catalyst, it is considered that the reduction processing proceeds gradually according to the temperature of the carbon monoxide selective oxidizing catalyst at that time, the reduction of the metal component is performed to a certain degree according to the temperature of the catalyst. As mentioned above, however, it is preferable that the carbon monoxide selective oxidizing reaction be performed at a sufficiently low temperature of 100 to 180° C., preferably at about 100 to 150° C., in order to improve the efficiency of the carbon monoxide selective oxidizing reaction, while suppressing undesirable reactions. Therefore, by performing the reduction processing in advance at a temperature sufficiently higher than the reaction temperature, it becomes possible to obtain sufficiently high catalytic activity from the beginning of the carbon monoxide selective oxidizing reaction. If the temperature of the reduction processing is set at 150° C. or higher, the metal oxidized through calcination on the carrier can be sufficiently reduced. The period of time for the reduction processing may be set appropriately according to the shape and size of the carbon monoxide selective oxidizing catalyst so as to ensure that the entire portion of the catalyst is reduced.

The carbon monoxide selective oxidizing catalyst according to a third embodiment of the invention is provided with a metal component including platinum (Pt) alone or platinum and a predetermined transition metal. This carbon monoxide selective oxidizing catalyst achieves a carbon monoxide reduction rate of 90% or higher when the carbon monoxide selective oxidizing reaction of the hydrogen-rich gas is performed under the following conditions (a) through (c):

(a) The contents of components other than hydrogen in the hydrogen-rich gas are as follows: the carbon monoxide concentration is about 5000 ppm; the carbon dioxide concentration is about 25%; and the oxygen content is such that the molar ratio value between oxygen atoms and carbon monoxide molecules ([O]/[CO]) is 1.
(b) The space velocity is about 22000 h$^{-1}$ when the hydrogen-rich gas is supplied onto the carbon monoxide selective oxidizing catalyst.
(c) The carbon monoxide selective oxidizing reaction proceeds at 130° C.

Preferably, the catalyst achieving the carbon monoxide reduction rate of 98% or higher is obtained when the carbon monoxide selective oxidizing reaction is performed under the conditions of (a) through (c).

Ideally, the carbon monoxide selective oxidizing reaction should be a reaction in which only carbon monoxide is selectively oxidized with no portions of the hydrogen-rich gas being oxidized. In such an ideal selective oxidizing reaction, the carbon monoxide is completely oxidized if the molar ratio value between oxygen atoms and carbon monoxide molecules ([O]/[CO]) in the supplied hydrogen-rich gas is 1. Therefore, as the carbon monoxide reduction rate becomes higher when the molar ratio value between oxygen atoms and carbon monoxide molecules ([O]/[CO]) is 1, the selectivity in selectively oxidizing only carbon monoxide becomes more excellent. As the percentage of the oxygen content with respect to the carbon monoxide content becomes higher, the carbon monoxide of the hydrogen-rich gas is oxidized more easily. Thus, the carbon monoxide reduction rate is improved. However, as the amount of supplied oxygen becomes larger, the hydrogen is also oxidized more easily. Therefore, it is preferable that a sufficient carbon monoxide reduction rate be achieved in a condition in which the molar ratio value between oxygen atoms and carbon monoxide molecules ([O]/[CO]) is close to 1.

The carbon monoxide selective oxidizing catalysts according the first to third embodiments can be employed for reducing the carbon monoxide concentration in the fuel gas supplied to the fuel cell. Hereinafter, a fuel cell system provided with a fuel reformer that employs a carbon monoxide selective oxidizing catalyst according these embodiments will be described. Any one of the carbon monoxide selective oxidizing catalysts according the first to third embodiments may be used as the carbon monoxide selective oxidizing catalyst. FIG. 1 is an explanatory diagram showing a schematic configuration of a fuel cell system provided with such a fuel reformer. This system is provided with a fuel cell 18 and a fuel reformer that generates fuel gas supplied thereto. The fuel reformer generates hydrogen by reforming a predetermined raw fuel. The fuel reformer is mainly composed of a reforming portion 10, a cooler 12, a shift portion 14, and a CO oxidizing portion 16. The raw fuel may be appropriately chosen from among hydrocarbons including natural gas and gasoline, alcohol including methanol, and hydrocarbon-based fuels such as ether and aldehyde.

In the reforming portion 10, these raw fuels are used with steam and air in a reaction called the steam reforming reaction or partial oxidation reaction to generate a hydrogen-rich gas containing carbon monoxide. The reforming portion 10 according to the embodiment functions as a hydrogen-rich gas supply apparatus. The hydrogen-rich gas generated through the reaction is supplied to the shift portion 14 and the CO oxidizing portion 16 in order to reduce the carbon monoxide concentration. Each of the reforming portion 10, shift portion 14, and the CO oxidizing portion 16 is provided with a catalyst that promotes a reaction proceeding therein. The internal temperature is controlled so as to be an appropriate reaction temperature according to the catalyst. For example, if gasoline is used as the raw fuel, the reforming reaction is performed under a temperature condition of about 900° C., but a shift reaction promoted by a shift catalyst is performed under a temperature condition of about 200 to 300° C. Therefore, in the system shown in FIG. 1, the hydrogen-rich gas generated in the reforming portion 10 is cooled in the cooler 12 before being supplied to the shift portion 14.

The shift portion 14 receives the supply of the hydrogen-rich gas from the cooler 12 and allows the shift reaction to proceed. The shift reaction produces hydrogen and carbon dioxide from carbon monoxide and water. Thus, the concentration of carbon monoxide in the hydrogen-rich gas is reduced. The hydrogen-rich gas, whose carbon monoxide concentration has been reduced by the shift portion 14, is supplied to the CO oxidizing portion 16. The CO oxidizing portion 16, which reduces the carbon monoxide concentration even further, is provided with one of the carbon monoxide selective oxidizing catalysts according to the first to third embodiments to allow the carbon monoxide selective oxidizing reaction to proceed. The CO oxidizing portion 16 may be configured into a container packed with a catalyst formed into pellets or a container housing a honeycomb tube coated with the catalyst. In addition, the CO oxidizing portion 16 is also provided with the blower 22 that supplies the CO oxidizing portion 16 with compressed air. Oxygen contained in the compressed air supplied by the blower 22 is used in the carbon monoxide selective oxidizing reaction. The hydrogen-rich gas, whose carbon monoxide concentration has been sufficiently reduced in this manner, is supplied as a fuel gas to an anode side of the fuel cell 18 to be used in electrochemical reactions. A blower 24 is connected to a cathode side of the fuel cell 18, and supplies air as an oxidizing gas.

In such a fuel cell system, the CO oxidizing portion 16 is provided with one of the carbon monoxide selective oxidizing catalysts according the first to third embodiments so as to ensure sufficiently high activity of the carbon monoxide selective oxidizing reaction. Therefore, the CO oxidizing portion 16 can be made more compact, and thus the entire system can be made more compact. Moreover, since the activity of the carbon monoxide selective oxidizing reaction is high, the concentration of carbon monoxide contained in the fuel gas supplied to the fuel cell 18 can be made sufficiently low. Accordingly, it is possible to sufficiently prevent the performance of the fuel cell 18 from deteriorating as a result of the catalyst being poisoned by carbon monoxide.

Furthermore, by using one of the carbon monoxide selective oxidizing catalysts according the first to third embodiments, the temperature range in which the carbon monoxide concentration can be sufficiently reduced is expanded. As a result, it is possible to stably reduce the carbon monoxide concentration even when the internal temperatures of the CO oxidizing portion 16 fluctuates. More specifically, for example, even if the magnitude of load connected to the fuel cell 18 fluctuates to vary the amount of gas processed by the CO oxidizing portion 16 (i.e., the amount of supplied hydrogen-rich gas), and accordingly the internal temperature of the CO oxidizing portion 16 increases and decreases (i.e., fluctuates), the carbon monoxide concentration can be reduced more stably.

In addition, by using one of the carbon monoxide selective oxidizing catalysts according the first to third embodiments, sufficiently high activity of the shift reaction can be ensured even under temperature conditions in which the activity of undesirable reactions is sufficiently low (for example, 100 to 180° C.). Therefore, it becomes possible to improve the overall efficiency of generating hydrogen from the raw fuel. Moreover, since the carbon monoxide selective oxidizing catalyst according the embodiment exhibits sufficiently high activity at a lower temperature, the time required for warming up the CO oxidizing portion 16 can be made shorter. When the fuel cell system is started, it is important that the reforming portion 10, the shift portion 14, and the CO oxidizing portion 16 be warmed to a temperature high enough for the reactions to take place in the reforming portion 10, the shift portion 14, and the CO oxidizing portion 16, and ideal reaction temperatures can be reached in the reforming portion 10, the shift portion 14, and the CO oxidizing portion 16 as soon as possible. During such startup processes, the CO oxidizing portion 16 is generally warmed by a high temperature gas supplied from an upstream side. However, since the carbon monoxide selective oxidizing catalyst is capable of promoting the carbon monoxide selective oxidizing reaction under lower temperature conditions, the carbon monoxide selective oxidizing reaction, that is, an exothermic reaction, proceeds in the CO oxidizing portion 16 under lower temperature conditions. Therefore, it becomes possible to shorten the starting time further.

It is to be understood that the invention is not limited to the first to third embodiments and that various changes and modifications may be made in the first to third embodiments without departing from the spirit and scope thereof. A carbon monoxide selective oxidizing catalyst according to a modified embodiment may be applied to the fuel reformer. In addition, a fuel cell system provided with this fuel reformer may be constructed.

(A) EXAMPLES 1, 2

In Examples 1 and 2, a carrier including ferrierite or ZSM-5 was used in a carbon monoxide selective oxidizing catalyst provided with Pt. The carbon monoxide selective oxidizing catalysts (1) to (7) described below were compared in terms of catalytic performance. The catalysts (1) to (7) are listed in ascending order in terms of the pore diameter in the carrier.

(1) Comparative Example 1: A catalyst in which Pt was supported on an A-type zeolite carrier [Pt (3 wt %)/A];
(2) Example 1: A catalyst in which Pt was supported on a ferrierite carrier [Pt (3 wt %)/Fer];
(3) Example 2: A catalyst in which Pt was supported on a ZSM-5 carrier [Pt (3 wt %)/ZSM-5];
(4) Comparative Example 2: A catalyst in which Pt was supported on a mordenite carrier [Pt (3 wt %)/Mor];
(5) Comparative Example 3: A catalyst in which Pt was supported on a zeolite β carrier [Pt (3 wt %)/β];
(6) Comparative Example 4: A catalyst in which Pt was supported on a USY-zeolite carrier [Pt (3 wt %)/USY];
(7) Comparative Example 5: A catalyst in which Pt was supported on an $Al_2O_3$ carrier [Pt (3 wt %)/$Al_2O_3$].

In each of the catalysts (1) to (7), the Pt content was equivalent to 3% of the carrier weight as indicated above. Each of the catalysts (1) to (7) was formed into a pellet. The pellet was packed in a reactor of a predetermined size and the carbon monoxide reduction rate (CO reduction rate) was measured for evaluation of catalytic performance.

Figure 2:
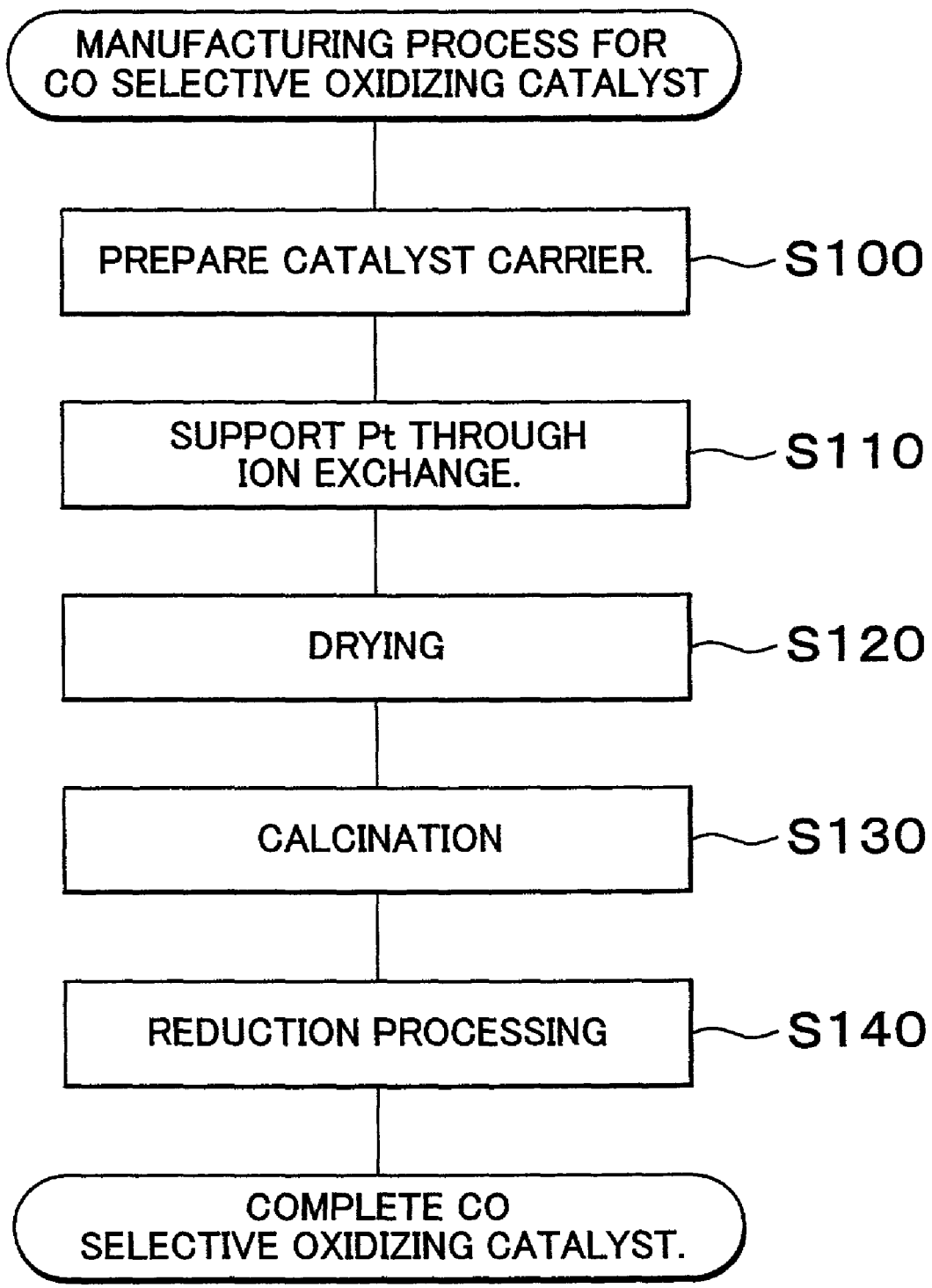
FIG. 2 is an explanatory diagram showing a manufacturing process for the catalyst described in Example 1.

FIG. 2 is an explanatory diagram showing the manufacturing process of the catalyst (2) in Example 1. In this example, the catalyst was manufactured using the known ion exchange method. First, a pellet including ferrierite was prepared as the catalyst carrier (step S100). In the example, a pellet measuring about 0.5×1.5 mm was used. The pellet was then soaked in a solution that contains hexaammineplatinum hydroxide salt equivalent to 3% of the weight of the pellet in terms of Pt. Ion exchange was performed between cations of ferrierite and Pt ions in the platinum salt solution so that Pt was supported on the pellet (step S110). Then, the pellet was dried for 2 hours or more at 120° C. in air (step S120), calcined for 1 hour at 250° C. (step S130), and was further subjected to a reduction processing for 2 hours at 300° C. in a hydrogen air stream (step S140) to obtain the catalyst (2).

Other catalysts were manufactured using the same procedure as that for the catalyst (2) in Example 1. For the catalysts (1) and (3) to (6), a pellet including A-type zeolite, a pellet including ZSM-5, a pellet including mordenite, a pellet including zeolite β, and a pellet including USY-zeolite were prepared, respectively, instead of the pellet including ferrierite in step S100. The same processings as those in steps S110 through S140 of the manufacturing process shown in FIG. 2 were then performed. Thus, Pt was supported as in the catalyst (2) to manufacture each catalyst. When the catalyst (7) was manufactured, a pellet including aluminum oxide ($Al_2O_3$) was used, and instead of the above-mentioned ion exchange method, the known impregnation method was used. That is, the aluminum oxide pellet was soaked in a dinitrodiamineplatinum nitrate solution equivalent to 3% of the weight of the pellet in terms of Pt to impregnate the pellet with platinum salt. Then, drying, calcination, and reduction processing were performed as in the ion exchange method.

Figure 3:
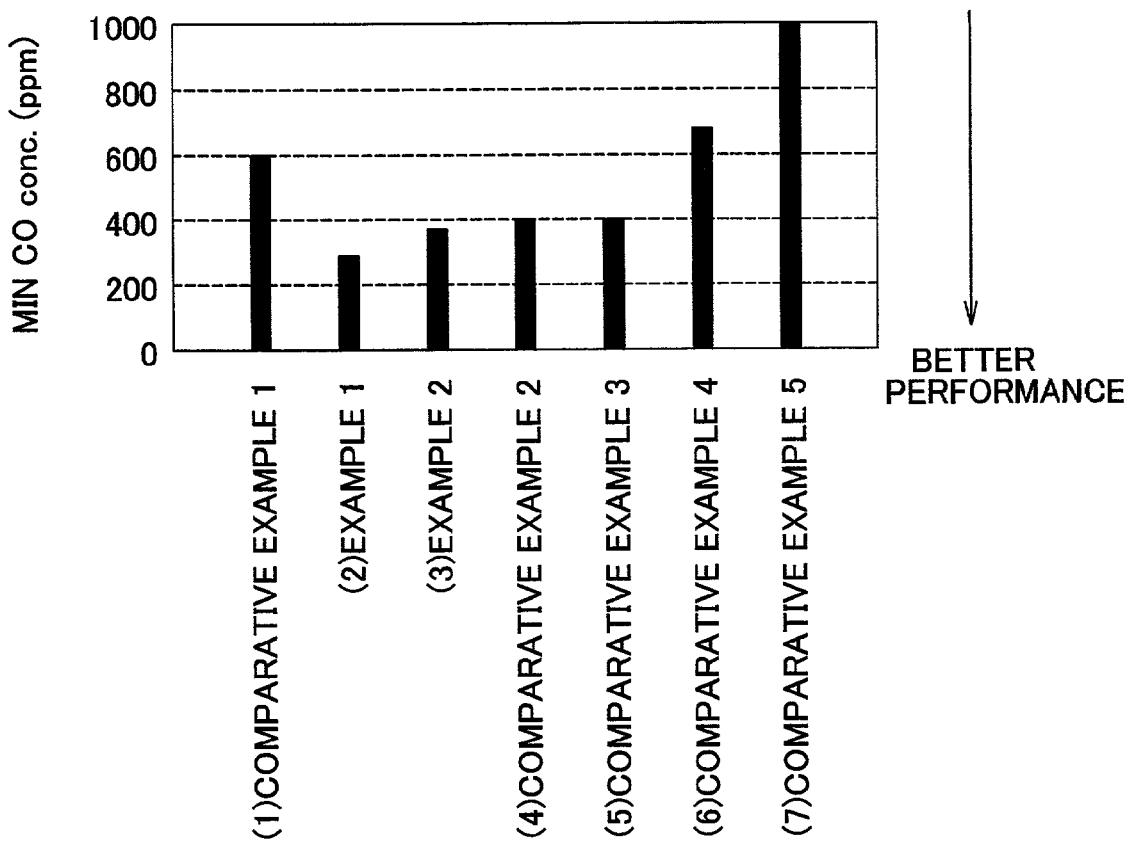
FIG. 3 is a chart showing the results of experiments regarding the amount of carbon monoxide reduced by carbon monoxide selective oxidizing catalysts manufactured by using different types of carriers.

A test gas of the following composition was supplied to a reactor in which each catalyst manufactured in this manner was packed. Then, the CO reduction rate was measured under the following conditions. FIG. 3 shows the results of the measurement.

Condition A. Test gas composition:
CO=0.5%, $CO_2$=25%;
Oxygen content (molar ratio) . . . [O]/[CO]=3;
$H_2$ balance (the remainder in the above gas composition was hydrogen).
Condition B. Space velocity SV=68,000 $h^{-1}$ The carbon monoxide concentration (CO concentration) in an exhaust gas discharged from the reactor was measured, while increasing the incoming gas temperature (the temperature of the test gas supplied to the reactor in which each catalyst was packed) sequentially from the room temperature to 300° C. The test gas composition was set based on the composition of a typical reformed gas.

FIG. 3 shows the minimum CO concentration in the exhaust gas achieved by each of the above-mentioned catalysts when the CO concentration in the exhaust gas was measured with the incoming gas temperature sequentially increased as mentioned above. That is, the minimum CO concentration values (MIN CO conc.) in the exhaust gas were plotted as ordinates. The lower the minimum CO concentration, the better the catalytic performance of reducing the CO concentration. As shown in FIG. 3, the catalysts (2) and (3) having ferrierite and ZSM-5 as the carriers thereof, respectively, achieve lower minimum CO concentration values as compared with other catalysts. Thus, the results show that the catalysts (2) and (3) have superior ability to reduce the CO concentration in the supplied hydrogen-rich gas.

Figure 4:
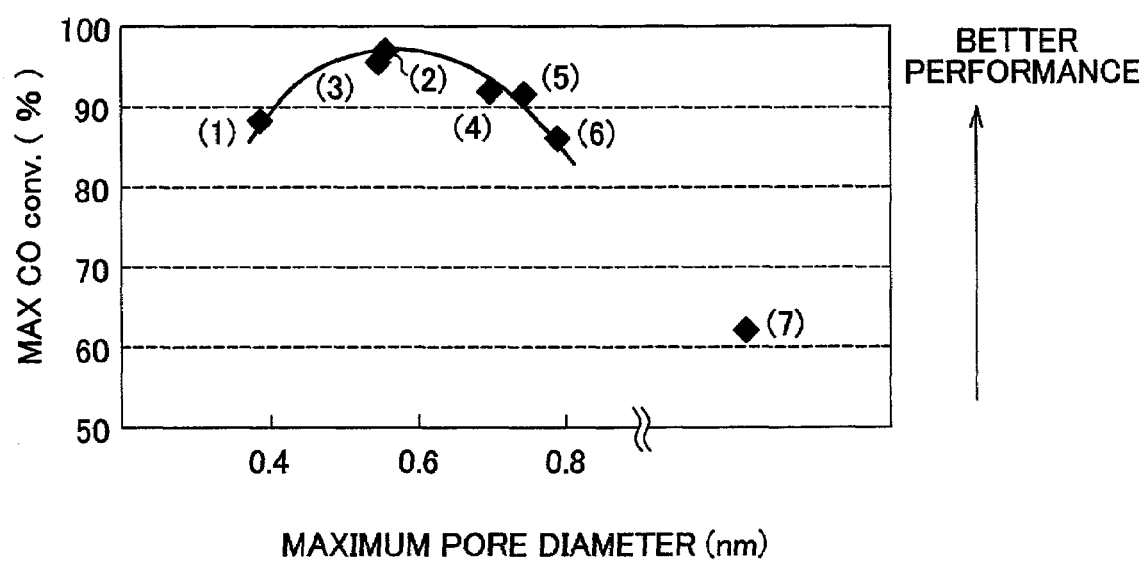
FIG. 4 is a chart showing the results of experiments regarding the relationship between the pore diameter of the carrier of each catalyst and the maximum CO reduction rate achieved by each catalyst.

FIG. 4 shows the relationship between the pore diameter of the carrier of each catalyst and the maximum CO reduction rate (MAX CO conv.) achieved by each catalyst. In this case, the CO reduction rate is represented as the molar ratio between "the content of CO changed to $CO_2$ through the carbon monoxide selective oxidizing reaction (this CO content is obtained from the CO content in the exhaust gas)" and "the content of CO before the reaction (CO content in the test gas)". The greater the CO reduction rate, the better the catalytic performance of reducing the CO concentration. As mentioned above, the maximum CO reduction rate means the greatest CO reduction rate value obtained when the CO reduction rates are calculated after the CO concentration values in the exhaust gas are measured with the incoming gas temperature sequentially changed. As shown in FIG. 4, the catalysts (2) and (3) having ferrierite and ZSM-5 as the carriers thereof, respectively, achieve higher maximum CO reduction rates as compared with other catalysts. Thus, the results show that the catalysts (2) and (3) have superior ability to reduce the CO concentration in the supplied hydrogen-rich gas.

(B) EXAMPLES 3 to 7

In Examples 3 through 7, in carbon monoxide selective oxidizing catalysts using ferrierite as carriers thereof, various types of transition metals were supported on the carriers in addition to Pt. In a catalyst in Example 3, iron (Fe) was supported on a ferrierite carrier together with Pt. In a catalyst in Example 4, nickel (Ni) was supported on a ferrierite carrier together with Pt. In a catalyst in Example 5, cobalt (Co) was supported on a ferrierite carrier together with Pt. In a catalyst in Example 6, manganese (Mn) was supported on a ferrierite carrier together with Pt. In a catalyst in Example 7, copper (Cu) was supported on a ferrierite carrier together with Pt.

In the cases of the catalysts in Examples 3 through 7, steps S100 and S110 in the manufacturing process shown in FIG. 2 were performed to support Pt on the ferrierite carriers. Then, drying and calcination were performed on the carriers on which Pt was supported in steps S120 and S130. Further, the above-mentioned transition metal (one of Fe, Ni, Co, Mn, and Cu) was supported to obtain the catalyst. In other words, the ferrierite pellet, on which Pt was supported through the ion exchange method, was soaked in a solution containing salt of one of the transition metals of Fe, Ni, Co, Mn, and Cu, and was agitated therein so that the transition metal was further supported on the ferrierite pellet. Thereafter, the same drying and calcination processes as steps S120 and S130 were performed to complete each catalyst. The manufactured catalyst was packed in a reactor of a predetermined size in the same manner as in Examples 1 and 2.

When the carbon monoxide selective oxidizing catalysts in these Examples were manufactured, the content of Pt supported on the carriers in the process corresponding to step S110 in the manufacturing process shown in FIG. 2 was 3% of the carrier weight. In addition, each of the above-mentioned transition metals was supported on the carrier so that the molar ratio of the supported Pt content to transition metal content was 3:1.

FIGS. 5A to 5D and 6A to 6C show the results of the measurement on the CO reduction rate using these catalysts under the above-mentioned conditions A and B (test gas composition and space velocity). The incoming gas temperature was sequentially increased from the room temperature to 300° C., and the CO concentration in the exhaust gas corresponding to each of the incoming gas temperatures was measured. Thus, changes in the CO reduction rate according to changes in the incoming gas temperature were examined.

Figure 5A:
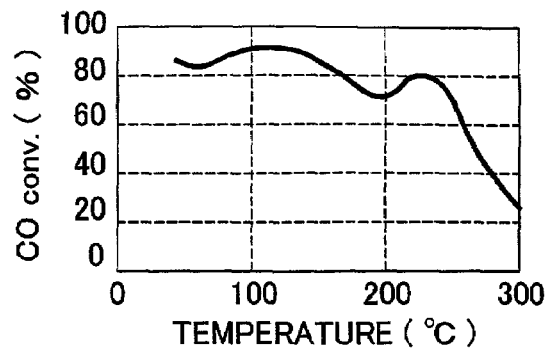
FIGS. 5A to 5D are explanatory charts showing the results of experiments regarding the effects of supporting different types of transition metals in addition to platinum.
Figure 5B:
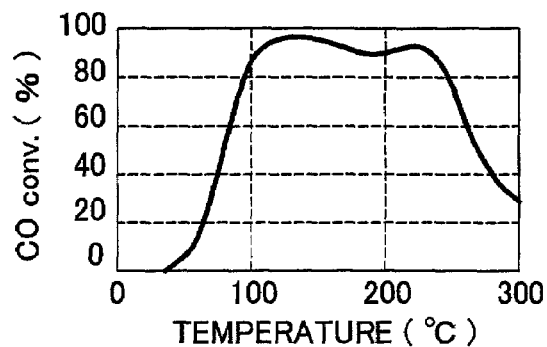
Figure 5C:
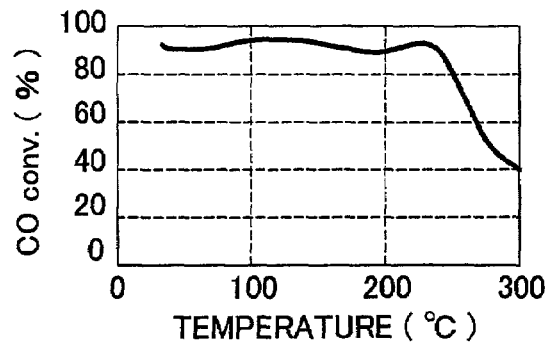
Figure 5D:
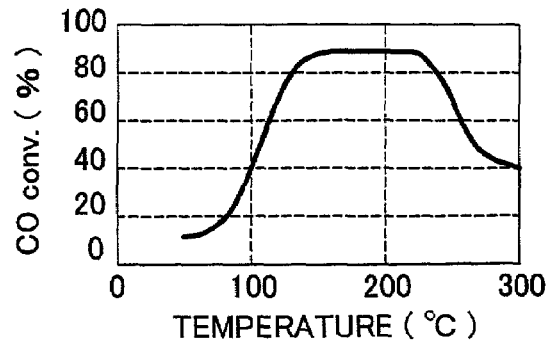
Figure 6A:
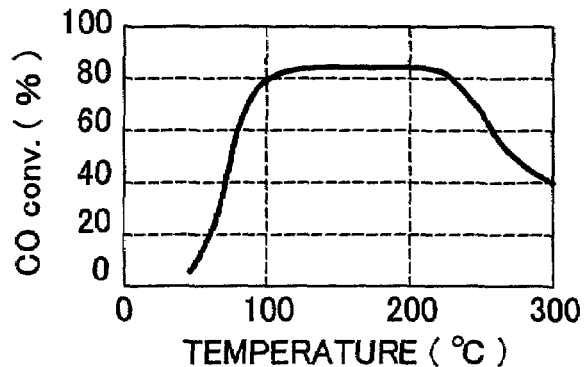
FIGS. 6A to 6C are explanatory charts showing the results of experiments regarding the effects of supporting different types of transition metals in addition to platinum.
Figure 6B:
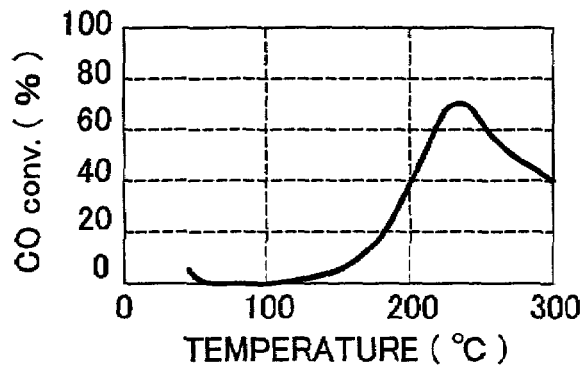
Figure 6C:
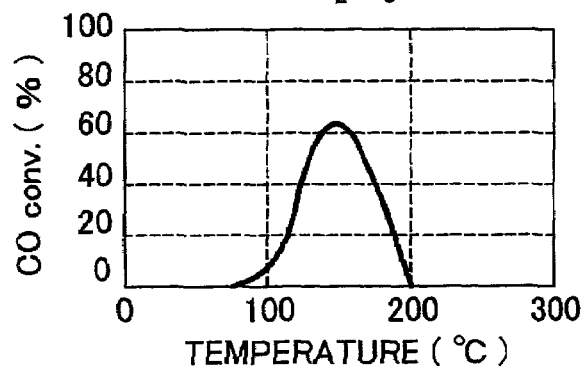

FIG. 5A shows the results in the case of using the catalyst in which iron (Fe) was supported on the ferrierite carrier together with Pt (Example 3). FIG. 5B shows the results in the case of using the catalyst in which nickel (Ni) was supported on the ferrierite carrier together with Pt (Example 4). FIG. 5C shows the results in the case of using the catalyst in which cobalt (Co) was supported on the ferrierite carrier (Example 5) together with Pt. FIG. 5D shows the results in the case of using the catalyst in which manganese (Mn) was supported on the ferrierite carrier together with Pt (Example 6). FIG. 6A shows the results in the case of using the catalyst in which copper (Cu) was supported on the ferrierite carrier together with Pt (Example 7). FIGS. 6B and 6C show the results in the cases of using the catalysts in Example 1 and Comparative Example 5, respectively.

Referring to FIG. 6B, the catalyst in Example 1, in which only Pt was supported on the ferrierite carrier, achieved a higher maximum CO reduction rate as compared with the catalyst in Comparative Example 5 (FIG. 6C), in which Pt was supported on the aluminum oxide carrier. When the above-mentioned transition metals were further supported in addition to Pt, the catalysts achieved even better maximum CO reduction rates than those in which only Pt was supported as shown in FIGS. 5A to 5D and 6A. In addition, the range of incoming gas temperatures in which high CO reduction rates could be obtained was expanded as compared with Example 1. The effect was that the range of incoming gas temperatures in which high CO reduction rates could be obtained was expanded toward the lower temperature side.

(C) EXAMPLES 8 to 11

Figure 7A:
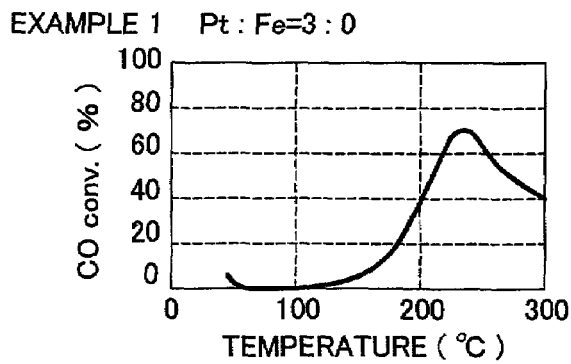
FIGS. 7A to 7C are charts showing the results of a comparison regarding the temperature dependency of carbon monoxide oxidizing performance in different types of carbon monoxide selective oxidizing catalysts manufactured while changing the supported Fe content.
Figure 7B:
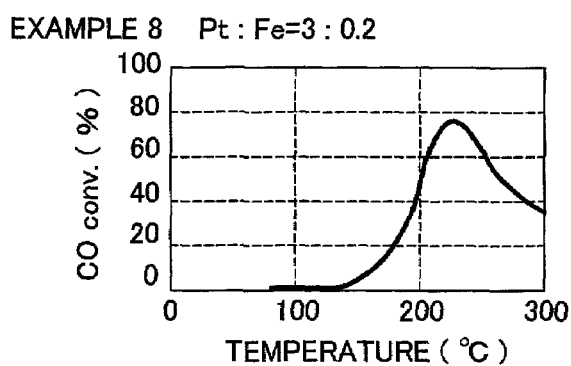
Figure 7C:
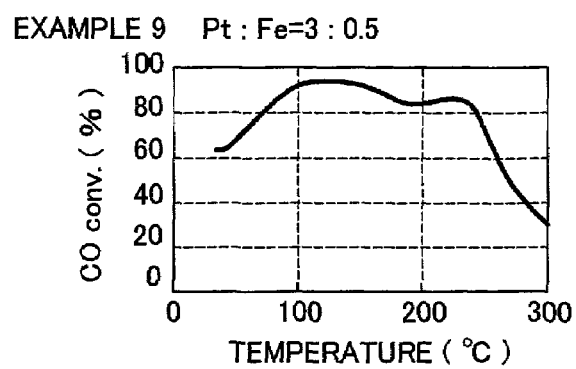
Figure 8A:
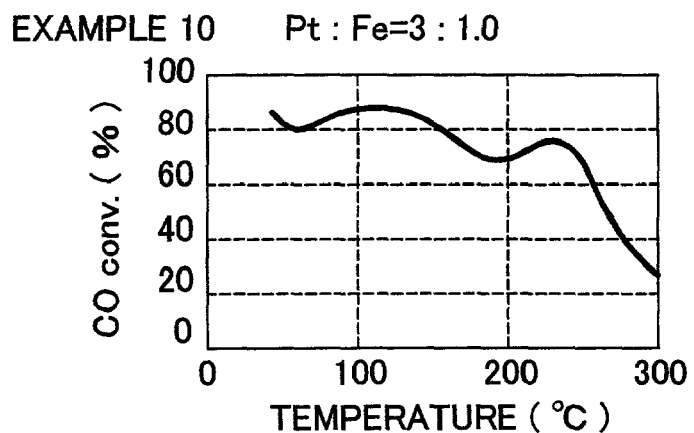
FIGS. 8A to 8C are charts showing the results of a comparison regarding the temperature dependency of carbon monoxide oxidizing performance in different types of carbon monoxide selective oxidizing catalysts manufactured while changing the supported Fe content.
Figure 8B:
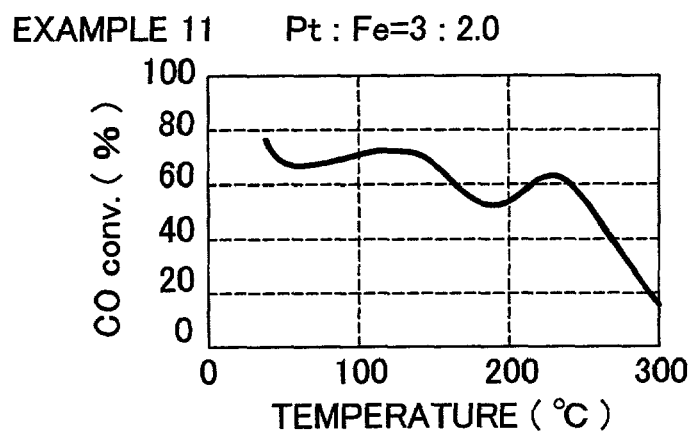
Figure 8C:
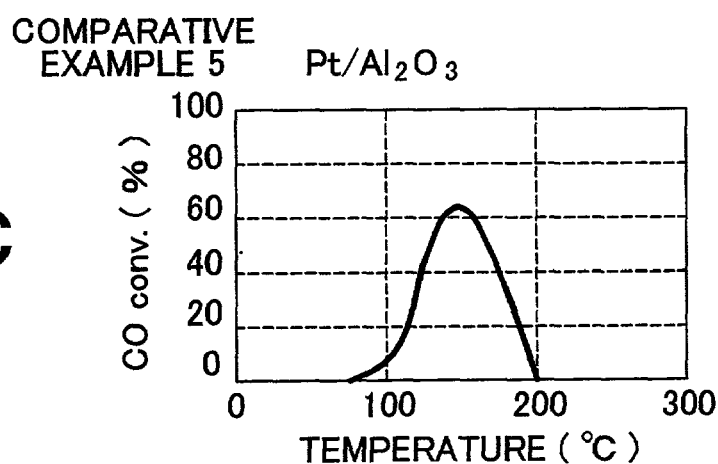

In Examples 8 through 11, the content of Fe supported on the carrier together with Pt was changed. FIG. 7A shows the results in the case where the above-mentioned catalyst in Example 1 (FIG. 6B) was used and the molar ratio of Pt to Fe in Example 1 was 3:0 (no Fe). FIG. 7B shows the results in the case where the catalyst in Example 8 was used, and the molar ratio of Pt to Fe was 3:0.2 (the molar ratio value between Pt and Fe is 15). FIG. 7C shows the results in the case where the catalyst in Example 9 was used, and the molar ratio of Pt to Fe was 3:0.5 (the molar ratio value between Pt and Fe is 6). FIG. 8A shows the results in the case where the catalyst in Example 10 was used, and the molar ratio of Pt to Fe was 3:1.0 (the molar ratio value between Pt and Fe is 3). FIG. 8B shows the results in the case where the catalyst in Example 11 was used, and the molar ratio of Pt to Fe was 3:2.0 (the molar ratio value between Pt and Fe is 1.5). The catalyst in Example 10 shown in FIG. 8A is the same as that in Example 3 shown in FIG. 5A. In addition, the catalyst shown in FIG. 8C is the same as that in Comparative Example 5 shown in FIG. 6C.

In Examples 8 through 11, the catalysts were manufactured using the same procedures as in Example 3. Further, when the transition metal Fe was supported on the ferrierite pellet on which Pt had been supported, the Fe content was changed. The manufactured catalysts were packed in reactors of a predetermined size in the same manner as in Examples 1 through 7 described earlier. The content of Pt supported on the ferrierite carrier was 3% of the carrier weight as in the Examples described earlier.

For each of these catalysts, the CO reduction rate was measured under the above-mentioned conditions A and B (test gas composition and space velocity). FIGS. 7A to 7C, and 8A to 8C show changes in the CO reduction rate according to changes in the incoming gas temperature when the incoming gas temperature was sequentially increased from the room temperature up to 300° C. and the CO concentration in the exhaust gas corresponding to each of the incoming gas temperatures was measured.

Figure 9:
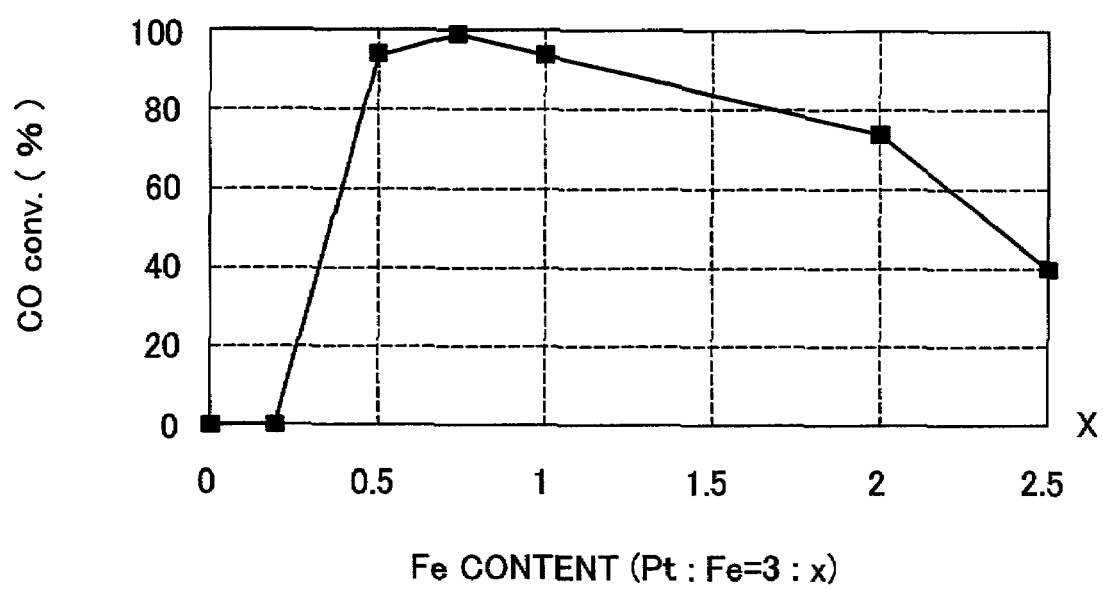
FIG. 9 is a chart showing the results of a comparison regarding the performance in different types of carbon monoxide selective oxidizing catalysts manufactured while changing the supported Fe content.

FIG. 9 shows the relationship between the CO reduction rate and the Fe content when the incoming gas temperature was 130° C. in FIGS. 7A to 7C and 8A to 8C. Note that a point at which the molar ratio of Pt to Fe was 3:0.75 (the molar ratio value between Pt and Fe was 4) and a point at which the molar ratio of Pt to Fe was 3:2.5 (the molar ratio value between Pt and Fe was 1.2) are added in FIG. 9.

As shown in FIGS. 7A to 7C and 8A to 8C, supporting Fe in addition to Pt increased the maximum carbon monoxide reduction rate. When the Fe content exceeded 0.2, the range of incoming gas temperatures in which high CO reduction rates could be obtained was expanded toward the lower temperature side. Particularly, when the molar ratio of Pt to Fe was from 3:0.5 (the molar ratio value between Pt and Fe was 6) to 3:2.0 (the molar ratio value between Pt and Fe was 1.5), the catalysts achieved extremely high carbon monoxide reduction rates in a range of incoming gas temperatures from 100 to 200° C., as compared with the carbon monoxide selective oxidizing catalysts in Comparative Example 5 and Examples 1 and 8. In addition, as shown in FIG. 9, the highest carbon monoxide reduction rate was achieved when the molar ratio of Pt to Fe was from 3:0.5 (the molar ratio value between Pt and Fe was 6) to 3:1.0 (the molar ratio value between Pt and Fe was 3), especially when the ratio was about 3:0.75 (the molar ratio value between Pt and Fe was 4) in the case where the incoming gas temperature was 130° C.

(D) EXAMPLE 12

In Example 12, the conditions for the reduction processing were changed when the carbon monoxide selective oxidizing catalyst, in which Fe was supported in addition to Pt, was manufactured. The catalysts in Example 12 were manufactured in the same manner as in Example 3. That is, Pt equivalent to 3% of the carrier weight was supported on a ferrierite pellet. Further, Fe was additionally supported such that the molar ratio of Pt to Fe was 3:0.75. The reduction processing was performed on each catalyst in a hydrogen stream for 2 hours at a different temperature. The manufactured catalysts were packed in reactors of a predetermined size as in the other Examples mentioned earlier.

Figure 10A:
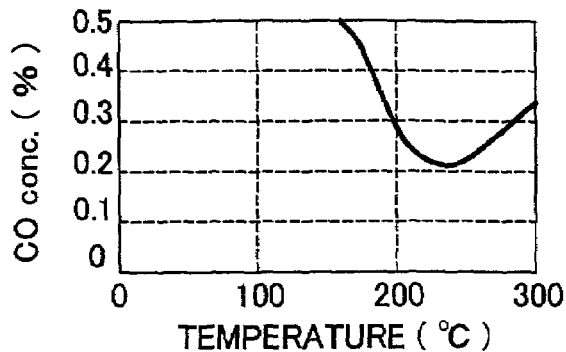
FIGS. 10A to 10D are explanatory diagrams showing the results of a comparison regarding the temperature dependency of carbon monoxide oxidizing performance in different types of carbon monoxide selective oxidizing catalysts processed while changing the reduction processing temperature.
Figure 10B:
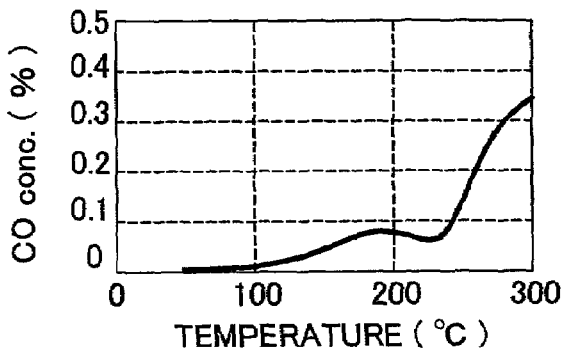
Figure 10C:
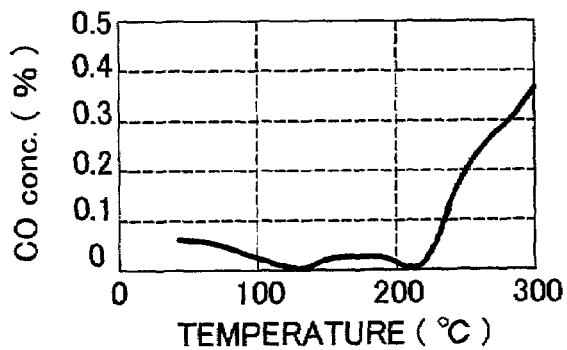
Figure 10D:
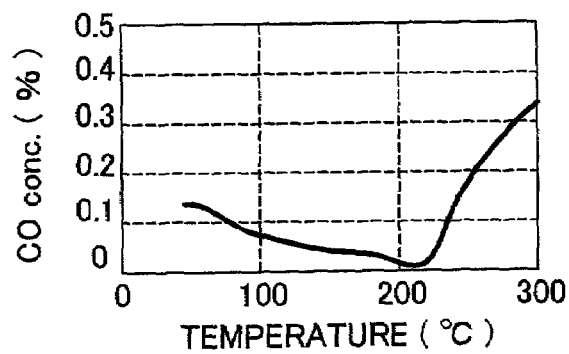

A catalyst in Example 12-1 shown in FIG. 10A was not subjected to any reduction processing; a catalyst in Example 12-2 shown in FIG. 10B was subjected to a reduction processing at 300° C.; a catalyst in Example 12-3 shown in FIG. 10C was subjected to a reduction processing at 350° C.; a catalyst in Example 12-4 shown in FIG. 10D was subjected to a reduction processing at 400° C.; a catalyst in Example 12-5 shown in FIG. 11A was subjected to a reduction processing at 450° C.; a catalyst in Example 12-6 shown in FIG. 11B was subjected to a reduction processing at 500° C.; and a catalyst in Example 12-7 shown in FIG. 11C was subjected to a reduction processing at 600° C. The catalyst shown in FIG. 11D is the same as that in Comparative Example 5 shown in FIG. 6C.

For each of these catalysts, the incoming gas temperature was sequentially increased from the room temperature to 300° C., and the CO concentration in the exhaust gas corresponding to each of the incoming gas temperatures was measured under the above-mentioned conditions A and B (test gas composition and space velocity). As shown in FIGS. 10A to 10D and 11A to 11D, the range of incoming gas temperatures in which the carbon monoxide concentration could be reduced more sufficiently was expanded toward the lower temperature side.

Figure 12:
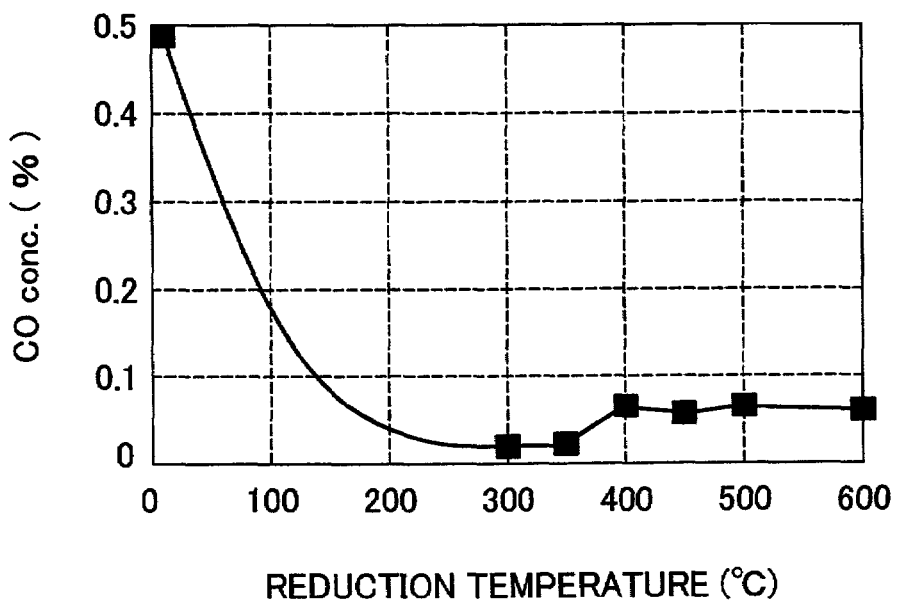
FIG. 12 is an explanatory diagram showing the results of experiments regarding the effects of the reduction processing temperature.

FIG. 12 is based on the results shown in FIGS. 10A to 10D and 11A to 11D, and shows the relationship between the reduction temperature and the CO concentration in the exhaust gas when the incoming gas temperature was 110° C. As shown in FIG. 12, the carbon monoxide concentration in the exhaust gas was particularly low when the reduction temperature was lower than 400° C.

(E) EXAMPLE 13

In Example 13, the carbon monoxide reduction rate was examined when changing the ratio between "the content of carbon monoxide in the hydrogen-rich gas whose carbon monoxide concentration is to be reduced" and "the content of oxygen used in the carbon monoxide selective oxidizing reaction". The catalyst in Example 13 was formed using a ceramic honeycomb. On the ceramic honeycomb, a ferrierite carrier, Pt, and Fe were supported.

The carbon monoxide selective oxidizing catalyst in Example 13 was manufactured as follows. First, a ceramic honeycomb was coated with a slurry manufactured by adding a predetermined binder to ferrierite powder as the catalyst carrier, and was then calcined. The ceramic honeycomb coated with ferrierite was soaked in a solution containing Pt salt and a solution containing Fe salt in the same manner as in the examples described earlier so as to support Pt and Fe on the ferrierite, and was subjected to calcination and reduction processing. The carbon monoxide selective oxidizing catalyst in Comparative Example 6 was manufactured in the same manner as in Example 13, except that, instead of applying the ferrierite slurry, an aluminum oxide slurry was applied to the ceramic honeycomb as the catalyst carrier and only Pt was supported on the applied aluminum oxide.

In the cases of the carbon monoxide selective oxidizing catalyst in Example 13 and the carbon monoxide selective oxidizing catalyst in Comparative Example 6, the carrier was applied to the ceramic honeycomb. The content of the carrier was 120 grams per 1 liter of ceramic honeycomb volume. The content of supported Pt was 3% of the carrier weight. The content of Fe supported in the carbon monoxide selective oxidizing catalyst in Example 13 was set such that the molar ratio of Pt to Fe was 3:1.

Figure 13:
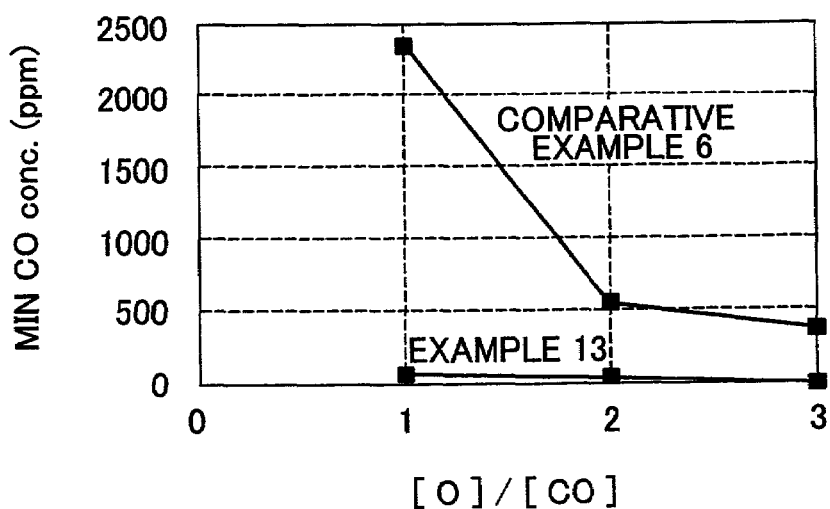
FIG. 13 is a chart showing the results of experiments regarding the effects of the molar ratio between oxygen atoms and carbon monoxide molecules on the reduced amount of carbon monoxide.

FIG. 13 shows the results of measurement on the carbon monoxide concentration in the exhaust gas when the molar ratio value between oxygen atoms and carbon monoxide molecules ([O]/[CO]) in the supplied hydrogen-rich gas (test gas) was changed to 1, 2, and 3, in the case where the carbon monoxide concentration in the hydrogen-rich gas was reduced using the carbon monoxide selective oxidizing catalyst in Example 13 and the carbon monoxide selective oxidizing catalyst in Comparative Example 6. Measurement conditions are as follows.

Condition C. Test gas composition:

$CO=0.5\%$, $CO_2=25\%$;

Oxygen content (molar ratio) . . . [O]/[CO]=3, 2, 1;

H₂ balance (the remainder in the above gas composition was hydrogen).

Condition D. Space velocity SV=22,000 h$^{-1}$.

As shown in FIG. 13, in the case where the carbon monoxide selective oxidizing catalyst in Example 13 was used, the carbon monoxide concentration in the exhaust gas could be reduced to 100 ppm or lower at all times when the molar ratio value between oxygen atom and carbon monoxide molecule was in the above-mentioned range. That is, under the conditions mentioned above, a carbon monoxide reduction rate of 98% or higher was achieved. On the other hand, in the case where the carbon monoxide selective oxidizing catalyst in Comparative Example 6 was used, when the molar ratio value between oxygen and carbon monoxide was 2 or 3, the carbon monoxide concentration in the exhaust gas was about 500 ppm and the carbon monoxide reduction rate was about 90%. When the molar ratio value between oxygen atom and carbon monoxide molecule was 1, the carbon monoxide concentration in the exhaust gas was about 2300 ppm and the carbon monoxide reduction rate was about 54%.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A carbon monoxide concentration reduction apparatus, comprising:
   a hydrogen-rich gas supply that supplies the hydrogen-rich gas;
   an oxygen supply that supplies oxygen used for oxidizing the carbon monoxide;
   a carbon monoxide selective oxidizing catalyst, comprising
      a carrier, the carrier comprising pores having a maximum allowable pore diameter of 0.65 nanometers (nm); and
      a metal component supported on the carrier and which includes one of platinum (Pt) alone and platinum (Pt) and at least one type of transition metal, wherein
      when the carbon monoxide selective oxidizing catalyst receives a supply of a hydrogen-rich gas containing carbon monoxide, the carbon monoxide selective oxidizing catalyst promotes a carbon monoxide selective oxidizing reaction that oxidizes the carbon monoxide by giving the carbon monoxide priority over hydrogen; and
   a carbon monoxide selective oxidizing reactor that includes the carbon monoxide selective oxidizing catalyst and receives a supply of the hydrogen-rich gas and the oxygen from the hydrogen-rich gas supply and the oxygen supply, respectively, to selectively oxidize carbon monoxide contained in the hydrogen-rich gas through the carbon monoxide selective oxidizing reaction, wherein
   the carbon monoxide concentration reduction apparatus oxidizes the carbon monoxide contained in the hydrogen-rich gas, thereby reducing a carbon monoxide concentration in the hydrogen-rich gas;
   the carrier consists of ferrierite; and
   the transition metal is at least one type of metal selected from the group consisting of cobalt (Co), manganese (Mn), chromium (Cr), and iridium (Ir).

2. The carbon monoxide concentration reduction apparatus according to claim 1, wherein the transition metal is at least one type of metal selected from the group consisting of cobalt (Co), and manganese (Mn).

3. The carbon monoxide concentration reduction apparatus according to claim 1, wherein the carbon monoxide selective oxidizing catalyst is subjected to a reduction processing before being used in order to promote the carbon monoxide selective oxidizing reaction after the metal component has been supported on the carrier.

4. The carbon monoxide concentration reduction apparatus according to claim 3, wherein the reduction processing is performed at a temperature higher than a temperature of the hydrogen-rich gas used for the carbon monoxide selective oxidizing reaction.

5. The carbon monoxide concentration reduction apparatus according to claim 3, wherein the reduction processing is performed at 150 to 370° C.

6. A fuel cell system provided with a fuel cell that receives a supply of a fuel gas containing hydrogen and an oxidizing gas containing oxygen, and that obtains an electromotive force through an electrochemical reaction, the fuel cell system comprising:
   a fuel gas supply that supplies the fuel cell with the fuel gas, wherein the fuel gas supply is provided with the carbon monoxide concentration reduction apparatus according to claim 1, and supplies the fuel cell with a hydrogen-rich gas whose carbon monoxide concentration has been reduced using the carbon monoxide concentration reduction apparatus as the fuel gas.

7. A carbon monoxide concentration reduction apparatus apparatus, comprising:
   a hydrogen-rich gas supply that supplies the hydrogen-rich gas;
   an oxygen supply that supplies oxygen used for oxidizing the carbon monoxide;
   a carbon monoxide selective oxidizing catalyst, comprising
      a carrier consisting of ferrierite and/or ZSM-5, the carrier comprising pores having a maximum allowable pore diameter of 0.65 nanometers (nm); and
      a metal component supported on the carrier, wherein
      when the carbon monoxide selective oxidizing catalyst receives a supply of a hydrogen-rich gas containing carbon monoxide, the carbon monoxide selective oxidizing catalyst promotes a carbon monoxide selective oxidizing reaction that oxidizes the carbon monoxide by giving the carbon monoxide priority over hydrogen; and
   a carbon monoxide selective oxidizing reactor that includes the carbon monoxide selective oxidizing catalyst and receives a supply of the hydrogen-rich gas and the oxygen from the hydrogen-rich gas supply and the oxygen supply, respectively, to selectively oxidize carbon monoxide contained in the hydrogen-rich gas through the carbon monoxide selective oxidizing reaction, wherein
   the carbon monoxide concentration reduction apparatus oxidizes the carbon monoxide contained in the hydrogen-rich gas, thereby reducing a carbon monoxide concentration in the hydrogen-rich gas;
   the metal component includes platinum (Pt) and at least one type of transition metal, and achieves a carbon monoxide reduction rate of at least 90% when the carbon monoxide selective oxidizing reaction is performed under conditions (a) through (c):
(a) contents of components other than hydrogen in the hydrogen-rich gas are as follows: a carbon monoxide concentration is about 5000 ppm; a carbon dioxide concentration is about 25%; and an oxygen content is such that a molar ratio value between oxygen atoms and carbon monoxide molecules ([O]/[CO]) is 1;
(b) a space velocity is about $22000h^{-1}$ when the hydrogen-rich gas is supplied onto the carbon monoxide selective oxidizing catalyst; and
(c) a reaction temperature is 130° C.; and wherein the transition metal is at least one type of metal selected from the group consisting of cobalt (Co), manganese (Mn), chromium (Cr), and iridium (Ir).

8. The carbon monoxide concentration reduction apparatus according to claim 7, wherein the carbon monoxide reduction rate of 98% or higher is achieved when the carbon monoxide selective oxidizing reaction is performed under the conditions (a) through (c).

9. A carbon monoxide concentration reduction apparatus apparatus, comprising:
a hydrogen-rich gas supply that supplies the hydrogen-rich gas;
an oxygen supply that supplies oxygen used for oxidizing the carbon monoxide;
a carbon monoxide selective oxidizing catalyst, comprising
a carrier, the carrier comprising pores having a maximum allowable pore diameter of 0.65 nanometers (nm); and
a metal component supported on the carrier and which includes one of platinum (Pt) alone and platinum (Pt) and at least one type of transition metal, wherein
when the carbon monoxide selective oxidizing catalyst receives a supply of a hydrogen-rich gas containing carbon monoxide, the carbon monoxide selective oxidizing catalyst promotes a carbon monoxide selective oxidizing reaction that oxidizes the carbon monoxide by giving the carbon monoxide priority over hydrogen; and
a carbon monoxide selective oxidizing reactor that includes the carbon monoxide selective oxidizing catalyst and receives a supply of the hydrogen-rich gas and the oxygen from the hydrogen-rich gas supply and the oxygen supply, respectively, to selectively oxidize carbon monoxide contained in the hydrogen-rich gas through the carbon monoxide selective oxidizing reaction, wherein
the carbon monoxide concentration reduction apparatus oxidizes the carbon monoxide contained in the hydrogen-rich gas, thereby reducing a carbon monoxide concentration in the hydrogen-rich gas;
the carrier consists of ZSM-5; and
the transition metal is at least one type of metal selected from the group consisting of cobalt (Co), manganese (Mn), chromium (Cr), and iridium (Ir).

10. A fuel cell system provided with a fuel cell that receives a supply of a fuel gas containing hydrogen and an oxidizing gas containing oxygen, and that obtains an electromotive force through an electrochemical reaction, the fuel cell system comprising:
a fuel gas supply that supplies the fuel cell with the fuel gas, wherein the fuel gas supply is provided with the carbon monoxide concentration reduction apparatus according to claim 9, and supplies the fuel cell with a hydrogen-rich gas whose carbon monoxide concentration has been reduced using the carbon monoxide concentration reduction apparatus as the fuel gas.

11. A fuel cell system provided with a fuel cell that receives a supply of a fuel gas containing hydrogen and an oxidizing gas containing oxygen, and that obtains an electromotive force through an electrochemical reaction, the fuel cell system comprising:
a fuel gas supply that supplies the fuel cell with the fuel gas, wherein the fuel gas supply is provided with the carbon monoxide concentration reduction apparatus according to claim 7, and supplies the fuel cell with a hydrogen-rich gas whose carbon monoxide concentration has been reduced using the carbon monoxide concentration reduction apparatus as the fuel gas.

* * * * *